United States Patent
Li et al.

(10) Patent No.: US 10,180,581 B2
(45) Date of Patent: Jan. 15, 2019

(54) IMAGE CORRECTION METHOD AND SYSTEM FOR ADJUSTABLE VIRTUAL REALITY HELMET

(71) Applicant: Beijing Pico Technology Co., Ltd., Beijing (CN)

(72) Inventors: Ligang Li, Beijing (CN); Yunlong Yang, HaiDian District (CN); Xiaogang Wang, Beijing (CN)

(73) Assignee: Beijing Pico Technology Co., Ltd. (CN)

( * ) Notice: Subject to any disclaimer, the term of this patent is extended or adjusted under 35 U.S.C. 154(b) by 115 days.

(21) Appl. No.: 15/254,151

(22) Filed: Sep. 1, 2016

(65) Prior Publication Data
US 2017/0070729 A1    Mar. 9, 2017

(30) Foreign Application Priority Data
Sep. 7, 2015    (CN) .......................... 2015 1 0564854

(51) Int. Cl.
| | |
|---|---|
| G02B 27/22 | (2018.01) |
| G06T 5/00 | (2006.01) |
| G06T 19/00 | (2011.01) |
| H04N 13/00 | (2018.01) |
| H04N 13/04 | (2006.01) |

(52) U.S. Cl.
CPC .......... G02B 27/2228 (2013.01); G06T 5/006 (2013.01); G06T 19/006 (2013.01); H04N 13/0033 (2013.01); H04N 13/044 (2013.01); G06T 2207/10024 (2013.01)

(58) Field of Classification Search
CPC ... G02B 27/2228; G06T 5/006; G06T 19/006; G06T 2207/10024; H04N 13/0033; H04N 13/044
See application file for complete search history.

(56) References Cited

U.S. PATENT DOCUMENTS

| | | | |
|---|---|---|---|
| 2015/0009416 A1* | 1/2015 | Tamayama | H04N 5/64 348/746 |
| 2017/0295353 A1* | 10/2017 | Hwang | H04N 13/0018 |

* cited by examiner

*Primary Examiner* — Christopher S Kelley
*Assistant Examiner* — Nasim N Nirjhar
(74) *Attorney, Agent, or Firm* — Taylor English Duma LLP

(57) ABSTRACT

The present invention discloses an image correction method for an adjustable virtual reality helmet. The method comprises the steps of: pre-storing in the helmet a corresponding relation table between a configuration parameter and an image correction parameter and an image correction formula of the helmet; acquiring a real-time configuration parameter of the helmet; searching in the corresponding relation table an image correction parameter corresponding to a configuration parameter closest to the real-time configuration parameter; and performing image correction by calling the image correction formula based on a searched image correction parameter. The present invention also provides an image correction system for an adjustable virtual reality helmet. The present invention can provide better image correction effects for an adjustable virtual reality helmet.

13 Claims, 2 Drawing Sheets

IMAGE CORRECTION METHOD AND SYSTEM FOR ADJUSTABLE VIRTUAL REALITY HELMET

CROSS-REFERENCE TO RELATED APPLICATIONS

This application claims priority to Chinese Patent Application No. 201510564854.7 filed on Sep. 7, 2015, the entire disclosure of which is hereby specifically and entirely incorporated by reference.

FIELD OF THE INVENTION

The present invention relates to image correction technologies, and particularly to an image correction method and system for an adjustable virtual reality helmet.

BACKGROUND OF THE INVENTION

It In recent years, as virtual reality (VR) technologies mature, various VR helmets appear. The working principle of VR helmets is that images generated by small two-dimensional displays (such as LCD display screens) are amplified by optical systems. Specifically, light emitted from small displays passes convex lenses so that a seemingly distant effect is produced by refraction. At the same time, left and right eye screens display left and right images through left and right lenses respectively. After acquiring information with parallax by human eyes, stereoscopic images are generated in brains.

The optical systems of VR helmets inevitably introduce optical distortion and color aberration effects.

The cause of optical distortion is that the amplification rate of a lens changes along with changes of angles between light beams and a main axis of the lens and is not a constant value. Depending on the difference of the lenses of the optical system, barrel-shaped or pillow-shaped distortion may be produced; the closer to the edges of the lenses of the optical system, the greater the distortion is; and there is almost no distortion at the centers of the lenses of the optical system. Usually, pillow-shaped distortion is generated by optical systems of VR helmets.

The color aberration effect is caused by different wavelengths and refractive indexes of light of different colors. Among visible lights, red light has larger wavelengths and smaller refractive indexes, while blue light has smaller wavelengths and larger refractive indexes. Color aberration will produce two results: object points cannot properly focus into perfect image points, which leads to a blur of image; a rainbow effect may be generated at peripheral parts of images, and particularly at junctions of bright and dark (black and white) parts.

Elimination of optical distortion and color aberration effects may be realized by advanced distortion-eliminating achromatic lenses (or lens groups). But distortion and color aberration cannot be eliminated completely, and further correction and compensation using digital image processing technologies are needed. For example, for an optical system with pillow-shaped distortion, barrel-shaped distortion is performed to the original image first; and after the processed image passes the optical system with pillow-shaped distortion, distortion is offset. Then, human eyes can see normal images without distortion. Optionally, color aberration compensation may be performed through calculations using three sets of parameters for the three RGB colors. Currently, the most widely used correction algorithm is the higher order polynomial model algorithm (usually three orders or above are expanded). Calculations are carried out by substituting image correction parameters in the polynomials, and image correction is performed based on the calculation results.

Existing VR helmets can be divided into non-adjustable ones and adjustable ones. An adjustable VR helmet means that a physical structure of the helmet can be changed. For example, a distance between a left eye lens center and a right eye lens center, and a distance between a lens and a screen can be adjusted. So, an adjustable VR helmet is suitable for most users with different interpupillary distances or with myopic eyes or presbyopic eyes, for example. However, the inventor(s) of the present invention find(s) that for an adjustable VR helmet, as the image correction parameters do not change, the original image correction parameters are used after the structure of the helmet is adjusted, so that the image correction effect is degraded. Particularly, when the physical structure of the helmet is changed substantially, imaging will be affected significantly, and human eyes will directly feel image deformation and color aberration effects.

SUMMARY OF THE INVENTION

An objective of the present invention is to provide novel technical solutions suitable for image correction for an adjustable virtual reality helmet.

According to a first aspect of the present invention, there is provided an image correction method for an adjustable virtual reality helmet. The method comprises the steps of: pre-storing, in the helmet, a corresponding relation table between a configuration parameter and an image correction parameter and an image correction formula of the helmet; acquiring a real-time configuration parameter of the helmet; searching, in the corresponding relation table, an image correction parameter corresponding to a configuration parameter closest to the real-time configuration parameter; and performing image correction by calling the image correction formula based on a searched image correction parameter.

Preferably, the image correction parameter comprises an image distortion parameter and/or an image color aberration parameter, and the image correction formula comprises an image distortion correction formula and/or an image color aberration compensation formula.

Preferably, a corresponding relation between the configuration parameter and the image correction parameter is acquired through a fitting experiment.

Preferably, the configuration parameter comprises a distance between a left lens center and a right lens center and/or a distance between a lens and a screen.

Preferably, the configuration parameter comprises a distance between a left lens center and a right lens center and a distance between a lens and a screen; the number of the image correction parameters is n, the image correction parameters including $k_1, k_2, \ldots, k_n$; an adjustable interval of the distance between the left lens center and the right lens center is $d_0 \sim d_r$, which is equally divided into n sub-intervals including $d_0 \sim d_0+(d_r-d_0)/n$, $d_0+(d_r-d_0)/n \sim d_0+2(d_r-d_0)/n$, ..., and $d_0+(n-1)(d_r-d_0)/n \sim d_r$; an adjustable interval of the distance between the lens and the screen is $D_0 \sim D_r$, which is equally divided into n sub-intervals including $D_0 \sim D_0+(D_r-D_0)/n$, $D_0+(D_r-D_0)/n \sim D_0+2(D_r-D_0)/n$, ..., $D_0+(n-1)(D_r-D_0)/n \sim D_r$; for any combination of a sub-interval of the distance between the left lens center and the right lens center and a sub-interval of the distance between the lens and the screen, the corresponding relation table includes a group of image correction parameters $k_1$, $k_2, \ldots, k_n$, which include n*n groups of image correction parameters $k_1, k_2, \ldots, k_n$.

Preferably, the real-time configuration parameter of the helmet is acquired by measurements or by calculations based on an adjustment parameter.

According to a second aspect of the present invention, there is provided an image correction system for an adjustable virtual reality helmet. The system comprises: a storing unit, a configuration parameter acquiring unit and an image correcting unit, wherein the storing unit is configured to store a corresponding relation table between a configuration parameter and an image correction parameter and an image correction formula of the helmet; the configuration parameter acquiring unit is configured to acquire a real-time configuration parameter of the helmet and report the same to the image correcting unit; and the image correcting unit is configured to search, in the corresponding relation table, an image correction parameter corresponding to a configuration parameter closest to the real-time configuration parameter, and perform image correction by calling the image correction formula based on a searched image correction parameter.

Preferably, the image correction parameter comprises an image distortion parameter and/or an image color aberration parameter, and the image correction formula comprises an image distortion correction formula and/or an image color aberration compensation formula.

Preferably, a corresponding relation between the configuration parameter and the image correction parameter is acquired through a fitting experiment.

Preferably, the configuration parameter comprises a distance between a left lens center and a right lens center and/or a distance between a lens and a screen.

Preferably, the configuration parameter comprises a distance between a left lens center and a right lens center and a distance between a lens and a screen; the number of the image correction parameters is n, the image correction parameters including $k_1, k_2, \ldots, k_n$; an adjustable interval of the distance between the left lens center and the right lens center is $d_0 \sim d_r$, which is equally divided into n sub-intervals including $d_0 \sim d_0 + (d_r - d_0)/n$, $d_0 + (d_r - d_0)/n \sim d_0 + 2(d_r - d_0)/n, \ldots$, and $d_0 + (n-1)(d_r - d_0)/n \sim d_r$; an adjustable interval of the distance between the lens and the screen is $D_0 \sim D_r$, which is equally divided into n sub-intervals including $D_0 \sim D_0 + (D_r - D_0)/n$, $D_0 + (D_r - D_0)/n \sim D_0 + 2(D_r - D_0)/n, \ldots$, $D_0 + (n-1)(D_r - D_0)/n \sim D_r$; for any combination of a sub-interval of the distance between the left lens center and the right lens center and a sub-interval of the distance between the lens and the screen, the corresponding relation table includes a group of image correction parameters $k_1$, $k_2, \ldots, k_n$, which include n*n groups of image correction parameters $k_1, k_2, \ldots, k_n$.

Preferably, the configuration parameter acquiring unit comprises a distance sensor configured to acquire the real-time configuration parameter by measurements; or the configuration parameter acquiring unit comprises a receiving unit configured to receive an adjustment parameter sent by a configuration adjusting unit, and a first calculating unit configured to calculate the real-time configuration parameter based on the adjustment parameter.

Preferably, the configuration parameter acquiring unit comprises a distance sensor configured to acquire the real-time configuration parameter by measurements, wherein the distance sensor periodically measures the real-time configuration parameter of the helmet or measures the real-time configuration parameter of the helmet after receiving an adjustment notification sent by a configuration adjusting unit.

The inventor(s) of the present invention find(s) that the prior arts do not disclose any technical solution suitable for image correction for an adjustable virtual reality helmet. Therefore, the technical problem to be solved by the present invention is not anticipated by those skilled in the art, and the present invention includes novel technical solutions.

By pre-storing a corresponding relation table between a configuration parameter and an image correction parameter in an adjustable virtual reality helmet, this invention can perform corresponding image correction according to real-time changes of the configuration parameter, thereby providing better image correction effects for the helmet.

Other features and advantages of the present invention will become apparent through the detailed descriptions of the embodiments of this invention with reference to the drawings.

BRIEF DESCRIPTION OF THE DRAWINGS

The drawings that are integrated into the description and constitute a part of the description show the embodiments of the present invention and are intended to explain the principle of the invention together with the descriptions thereof.

Figure 1:
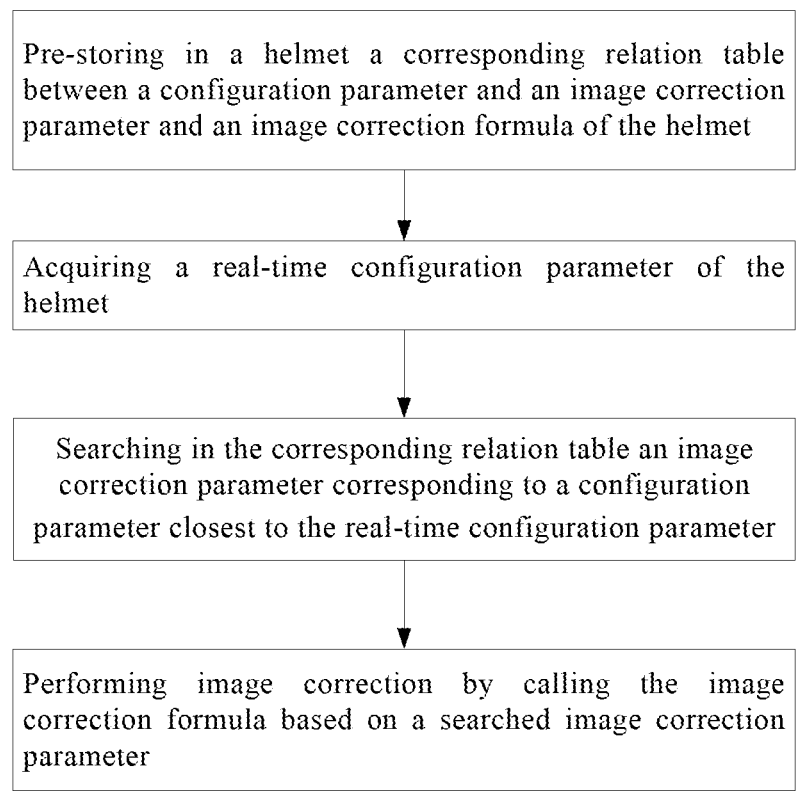
FIG. 1 is a schematic diagram showing the steps of an image correction method for an adjustable virtual reality helmet according to the present invention.

Explanation for the reference signs in the drawings: 100—storing unit; 200—configuration parameter acquiring unit; 300—image correcting unit; 400—configuration adjusting unit; 201—205—distance sensors; 1—lens; 2—screen; 3—first baffle; 4—second baffle; 5—third baffle; 6—first transverse beam.

DETAILED DESCRIPTION OF THE EMBODIMENTS

Now, various embodiments of this invention will be described in detail with reference to the drawings. It should be noted that, unless specified otherwise, the arrangements of the members and steps, the mathematical formulas and numerical values described in these embodiments do not restrict the scope of the invention.

The following descriptions for at least one embodiment are actually descriptive only, and shall not be intended to limit the invention and any application or use thereof.

The techniques, methods and devices well known to those skilled in the related arts may not be discussed in detail. However, where applicable, such techniques, methods and devices should be deemed as a part of the description.

Any specific value shown herein and in all the examples should be interpreted as illustrative only rather than restrictive. Therefore, other examples of the embodiments may include different values.

It should be noted that similar signs and letters in the following drawings represent similar items. Therefore, once defined in one drawing, an item may not be further discussed in the followed drawings.

FIG. 1 shows an embodiment of an image correction method for an adjustable virtual reality helmet according to the present invention. The method comprises the steps of: pre-storing, in the helmet, a corresponding relation table between a configuration parameter and an image correction parameter and an image correction formula of the helmet; acquiring a real-time configuration parameter of the helmet; searching, in the corresponding relation table, an image correction parameter corresponding to a configuration parameter closest to the real-time configuration parameter; and performing image correction by calling the image correction formula based on a searched image correction parameter.

Preferably, the image correction parameter may comprise an image distortion parameter and/or an image color aberration parameter, and accordingly the image correction formula may comprise an image distortion correction formula and/or an image color aberration compensation formula. The configuration parameters may comprise a distance between a left lens center and a right lens center (or an interpupillary distance (IPD)) and/or a distance between a lens and a screen. The real-time configuration parameter of the helmet may be acquired by measurements or by calculations based on an adjustment parameter, for example. The former acquisition manner may include acquiring the distance between the left lens center and the right lens center and the distance between the lens and the screen through measurements using a distance sensor. The later acquisition manner may include calculating an adjusted real-time IPD parameter. For example, after a distance between left and right lenses is increased by 0.5 cm using an IPD adjusting unit, an adjusted real-time IPD parameter may be calculated based on an adjustment parameter of "an increase by 0.5 cm" sent by the IPD adjusting unit.

An example of acquiring a corresponding relation between the configuration parameter and the image correction parameter in this embodiment is described as below.

In this embodiment, the configuration parameter comprises a distance between a left lens center and a right lens center and a distance between a lens and a screen; the number of the image correction parameters is n, the image correction parameters including $k_1, k_2, \ldots, k_n$; an adjustable interval of the distance between the left lens center and the right lens center is $d_0 \sim d_r$, which is equally divided into n sub-intervals including $d_0 \sim d_0 + (d_r - d_0)/n$, $d_0 + (d_r - d_0)/n \sim d_0 + 2(d_r - d_0)/n$, ..., and $d_0 + (n-1)(d_r - d_0)/n \sim d_r$; an adjustable interval of the distance between the lens and the screen is $D_0 \sim D_r$, which is equally divided into n sub-intervals including $D_0 \sim D_0 + (D_r - D_0)/n$, $D_0 + (D_r - D_0)/n \sim D_0 + 2(D_r - D_0)/n$, ..., $D_0 + (n-1)(D_r - D_0)/n \sim D_r$.

A corresponding relation table between the configuration parameter and the image correction parameter is acquired through a fitting experiment. For any combination of a sub-interval of the distance between the left lens center and the right lens center and a sub-interval of the distance between the lens and the screen, the corresponding relation table includes a group of image correction parameters $k_1, k_2, \ldots, k_n$, which include n*n groups of image correction parameters $k_1, k_2, \ldots, k_n$.

The image correction parameters $k_1, k_2, \ldots, k_n$ are related to configuration parameters such as a lens diameter, a center-to-center distance of the lenses, the distance between the lens and the screen, and so on. Changes of any configuration parameter will cause changes of optical paths, of degrees and representation of distortion, of a generated optical fitting chart and of image correction parameters. However, the features of the lenses (or lens groups) of different VR helmets differ greatly; some lenses include both convex and concave lenses, while others include non-spherical lenses; when the diameters of some lenses become larger, $k_1$ become smaller, whereas when the diameters of other lenses become larger, $k_1$ become larger.

Therefore, although $k_1, k_2, \ldots,$ and $k_n$ are affected by such parameters as the lens diameter, the center-to-center distance of the lens and so on, it is difficult to establish a simple and uniform corresponding relation among them. Therefore, fitting experiments are carried out in this invention, so that image correction curves for the combination of the micro segments of the configuration parameter are fitted based on huge experiment data, and approximate empirical values of the image correction parameters $k_1, k_2, \ldots, k_n$ in various cases are acquired and pre-stored in the helmet. During application of the helmet, image correction can be performed by calling the corresponding image correction parameters based on the actual configuration parameters of the helmet. The fitted image correction parameters $k_1, k_2, \ldots, k_n$ for different helmets are different.

Figure 2:
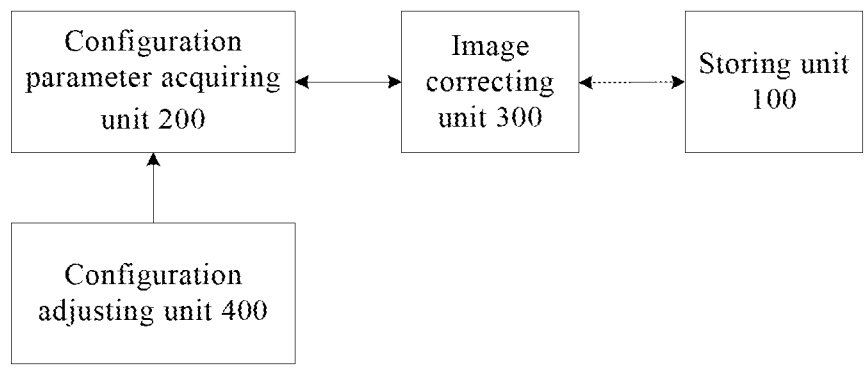
FIG. 2 is a circuit block view showing an image correction system for an adjustable virtual reality helmet according to the present invention.

FIG. 2 shows a first embodiment of an image correction system for an adjustable virtual reality helmet according to the present invention. The system comprises: a storing unit 100, a configuration parameter acquiring unit 200 and an image correcting unit 300.

The storing unit 100 is configured to store a corresponding relation table between a configuration parameter and an image correction parameter and an image correction formula of the helmet.

The configuration parameter acquiring unit 200 is configured to acquire a real-time configuration parameter of the helmet and report the same to the image correcting unit.

The image correcting unit 300 is configured to search, in the corresponding relation table, an image correction parameter corresponding to a configuration parameter closest to the real-time configuration parameter, and perform image correction by calling the image correction formula based on a searched image correction parameter.

Preferably, the image correction parameter may comprise an image distortion parameter and/or an image color aberration parameter, and accordingly the image correction formula may comprise an image distortion correction formula and/or an image color aberration compensation formula.

Preferably, a corresponding relation between the configuration parameter and the image correction parameter is acquired through a fitting experiment, in this embodiment. The specific process has been described in the aforementioned part. In this embodiment, the configuration parameter comprises a distance between a left lens center and a right lens center and a distance between a lens and a screen. The number of the image correction parameters is n, the image correction parameters including $k_1, k_2, \ldots, k_n$; an adjustable interval of the distance between the left lens center and the right lens center is $d_0 \sim d_r$, which is equally divided into n sub-intervals including $d_0 \sim d_0 + (d_r - d_0)/n$, $d_0 + (d_r - d_0)/n \sim d_0 + 2(d_r - d_0)/n$, ..., and $d_0 + (n-1)(d_r - d_0)/n \sim d_r$; an adjustable interval of the distance between the lens and the screen is $D_0 \sim D_r$, which is equally divided into n sub-intervals including $D_0 \sim D_0 + (D_r - D_0)/n$, $D_0 + (D_r - D_0)/n \sim D_0 + 2(D_r - D_0)/n$, ..., $D_0 + (n-1)(D_r - D_0)/n \sim D_r$; for any combination of a sub-interval of the distance between the left lens center and the right lens center and a sub-interval of the distance between the lens and the screen, the corresponding relation table as shown in Table 1 includes a group of image correction parameters $k_1, k_2, \ldots, k_n$, which include n*n groups of image correction parameters $k_1, k_2, \ldots, k_n$.

TABLE 1

Corresponding Relation Table

| Distance d between a left lens center and a right lens center | Distance D between a lens and a screen | $k_1$ | $k_2$ | $k_3$ | ... | $k_n$ |
|---|---|---|---|---|---|---|
| $d_0$ | $D_0$ | | | | | |
| | $D_0 + (D_r - D_0)/n$ | | | | | |
| | $D_0 + 2 (D_r - D_0)/n$ | | | | | |
| | $D_0 + 3 (D_r - D_0)/n$ | | | | | |
| | ... | | | | | |
| | $D_0 + (n - 1) (D_r - D_0)$ | | | | | |
| | $D_r$ | | | | | |
| $d_0 + (d_r - d_0)/n$ | $D_0$ | | | | | |
| | $D_0 + (D_r - D_0)/n$ | | | | | |
| | $D_0 + 2 (D_r - D_0)/n$ | | | | | |
| | $D_0 + 3 (D_r - D_0)/n$ | | | | | |
| | ... | | | | | |
| | $D_0 + (n - 1) (D_r - D_0)$ | | | | | |
| | $D_r$ | | | | | |
| ... | | | | | | |
| $d_r$ | $D_0$ | | | | | |
| | $D_0 + (D_r - D_0)/n$ | | | | | |
| | $D_0 + 2 (D_r - D_0)/n$ | | | | | |
| | $D_0 + 3 (D_r - D_0)/n$ | | | | | |
| | ... | | | | | |
| | $D_0 + (n - 1) (D_r - D_0)$ | | | | | |
| | $D_r$ | | | | | |

As shown in FIG. 2, in the first embodiment, the configuration parameter acquiring unit 200 is connected to a configuration adjusting unit 400. The configuration parameter acquiring unit 200 comprises a distance sensor configured to measure the real-time configuration parameter. After each adjustment, the configuration adjusting unit 400 actively sends an adjustment notification to the configuration parameter acquiring unit. The distance sensor measures the real-time configuration parameter of the helmet for once. In other embodiments, the distance sensor may periodically and actively measure the real-time configuration parameter of the helmet.

In other embodiments, as described in the above, the real-time configuration parameter of the helmet may be acquired through calculations based on the adjustment parameter. The configuration parameter acquiring unit 200 comprises a receiving unit configured to receive the adjustment parameter sent by the configuration adjusting unit 400, and a first calculating unit configured to calculate the real-time configuration parameter based on the adjustment parameter.

Figure 3:
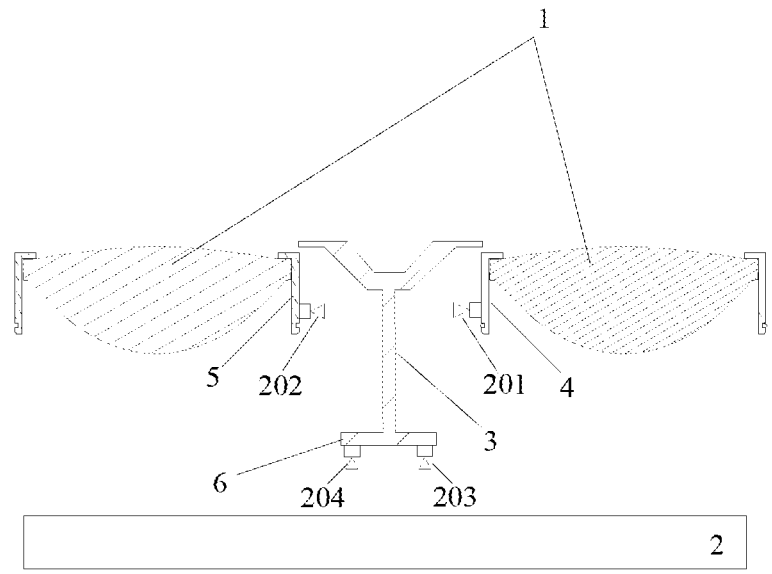
FIG. 3 is a schematic drawing showing an arrangement manner of a distance sensor according to the present invention.

FIG. 3 shows an embodiment in which the configuration parameter acquiring unit 200 measures the distance between the left lens center and the right lens center. The lens 1 is mounted on a bracket which comprises a first baffle, a second baffle and a third baffle. The first baffle 3 is positioned between the left and right lenses for separating the same; the second baffle 4 is positioned at a right edge of the left lens and is fixed relative to the left lens; and the third baffle 5 is positioned at a left edge of the right lens and is fixed relative to the right lens.

A distance sensor 201, which is provided at the second baffle 4 and faces the first baffle 3, is configured to measure a distance between the distance sensor 201 and the first baffle 3. A distance sensor 202, which is provided at the third baffle 5 and faces the first baffle 3, is configured to measure a distance between the distance sensor 202 and the first baffle 3. A second calculating unit (not shown in the figures) is configured to calculate the distance between the left lens center and the right lens center, which equals to the distance between the distance sensor 201 and the first baffle 3 plus the distance between the distance sensor 202 and the first baffle 3, plus a distance between the distance sensor 201 and left lens center, and plus a distance between the distance sensor 202 and right lens center.

The arrangement manners of the distance sensors 201, 202 in this embodiment are applicable to a case where the left and right lenses and adjusted symmetrically, i.e., where the left and right lenses approach towards each other or move away from each other simultaneously and the distance between the first baffle 3 and the left lens is always the same as that between the first baffle 3 and the right lens. The arrangement manners of the distance sensors 201, 202 in this embodiment are also applicable to a case where the left and right lenses and adjusted asymmetrically, such as a case when the left lens moves horizontally while the right lens does not move. When the left and right lenses are adjusted asymmetrically, the distance between the first baffle 3 and the left lens may be different from that between the first baffle 3 and the right lens, and the left and right lenses may need different image correction parameters.

In another embodiment, the distance sensor 201, which is provided at the first baffle 3 and faces the second baffle 4, is configured to measure a distance between the distance sensor 201 and the second baffle 4. The distance sensor 202, which is provided at the first baffle 3 and faces the third baffle 5, is configured to measure a distance between the distance sensor 202 and the third baffle 5. The second calculating unit is configured to calculate the distance between the left lens center and the right lens center, which equals to the distance between the distance sensor 201 and the second baffle 4 plus the distance between the distance sensor 202 and the third baffle 5, plus a distance between the second baffle 4 and the left lens center, and plus a distance between the third baffle 5 and the right lens center.

In yet another embodiment, when the left and right lenses and adjusted symmetrically, either of the distances sensors 201, 202 may be omitted. The distance between the left lens center and the right lens center equals to (the distance between the distance sensor 201 and the first baffle 3 plus the distance between the distance sensor 201 and the left lens center)*2, or equals to (the distance between the distance sensor 202 and the first baffle 3 plus the distance between the distance sensor 202 and the right lens center)*2.

FIG. 3 shows an embodiment in which the configuration parameter acquiring unit 200 measures distances from the left and right lenses to the screen respectively. An end of a central bracket between the left and right lenses, which is close to the screen, is provided with a transverse beam 6 parallel with a plane in which the left and right lenses are located, wherein a distance from the transverse beam 6 to the plane in which the left and right lenses are located is fixed. A left end of the transverse beam 6 is provided with a distance sensor 203 and faces the screen. The distance sensor 203 is used for measuring a distance between the distance sensor 203 and the screen. A right end of the transverse beam 6 is provided with a distance sensor 204 and faces the screen. The distance sensor 204 is used for measuring a distance between the distance sensor 204 and the screen.

A third calculating unit (not shown in the figures) is configured to calculate the distances from the left and right lenses to the screen respectively. As the transverse beam 6 is parallel with the plane in which the left and right lenses are located, and the distance from the transverse beam 6 to the plane in which the left and right lenses are located is fixed, the distance from the left lens to the screen equals to a distance between the distance sensor 203 and the screen plus the distance from the transverse beam 6 to the plane in which the left and right lenses are located, and the distance from the right lens to the screen equals to a distance between the distance sensor 204 and the screen plus the distance from the transverse beam 6 to the plane in which the left and right lenses are located.

The above embodiment is applicable to a case where positions of the left and right eye screens can be adjusted independently. If positions of the left and right eye screens cannot be adjusted independently, either of the distance sensors 203 and 204 can be omitted.

Figure 4:
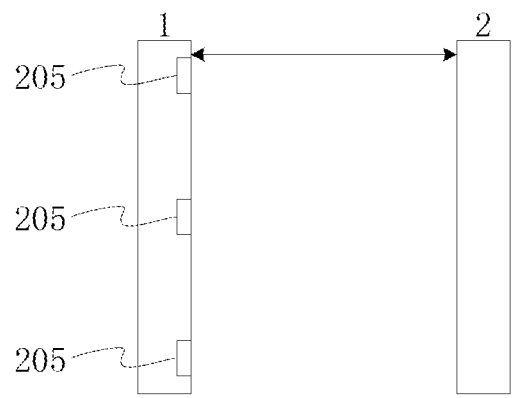
FIG. 4 is a schematic drawing showing an arrangement manner of a distance sensor according to the present invention.

FIG. 4 shows an embodiment in which the configuration parameter acquiring unit 200 measures a distance from the lens to the screen and which is applicable to a case where the left and right eye screens cannot be adjusted independently. Distance sensors 205 may be mounted at an upper position, an intermediate position and a lower position of a lens plane and face the screen for measuring the distances from the upper, intermediate and lower positions to the screen respectively. By averaging the three distances, the distance from the lens to the screen can be measured accurately.

Considering that the eyes of a user are basically in a sealed and black environment after the user wears a VR helmet, infra-red distance sensors are preferred. An infra-red distance sensor includes diodes for transmitting and receiving an infra-red signal. A transmitting diode transmits an infra-red signal of a certain frequency, and a receiving diode receives such a signal. When an obstacle is encountered in an infra-red detecting direction, the infra-red signal is reflected back and received by the receiving diode. The distance between the infra-red distance sensor and the obstacle can be measured after calculations. Infra-red distance sensors of Sharp GP2Y0D805Z0F and GP2Y0D805Z0F models are preferred. The maximum distance finding range of these sensors is 5 cm with a precision of 0.1 mm, and thus these sensors are suitable for VR helmets and the technical solutions of this invention. In other embodiments, the distance sensors may be selected from ultrasonic wave distance sensors or the like.

By pre-storing a corresponding relation table between a configuration parameter and an image correction parameter in a VR helmet, this invention performs distortion correction and color aberration compensation by selecting different correction parameter values according to real-time configuration parameters, such that the adjustable range of the configuration of the helmet is expanded, thereby effectively improving the optical performance of the VR helmet. Preferably or optionally, this invention effectively solves the problem that specific populations, such as highly presbyopic or myopic people, and people with excessively large or small IPDs, cannot enjoy VR 3D images, and can provide clear 3D images free from distortion and color aberration to users.

In example embodiments of the disclosure, there may be an image correction method for an adjustable virtual reality helmet. The image correction method may include pre-storing, in the virtual reality helmet, a corresponding relation table between a configuration parameter and an image correction parameter and an image correction formula of the virtual reality helmet. The image correction method may include acquiring a real-time configuration parameter of the virtual reality helmet. The image correction method may include searching, in the corresponding relation table, an image correction parameter corresponding to a configuration parameter closest to the real-time configuration parameter. The image correction method may include performing image correction by calling the image correction formula based on a searched image correction parameter. The image correction parameter may include an image distortion parameter and an image color aberration parameter, wherein the image correction formula may include an image distortion correction formula and an image color aberration compensation formula. The configuration parameter may include a distance between a left lens center and a right lens center and a distance between a lens and a screen. The configuration parameter may include a number of the image correction parameters is n, the image correction parameters including $k_1, k_2, \ldots, k_n$. The configuration parameter may include an adjustable interval of the distance between the left lens center and the right lens center is $d_0 \sim d_r$, which is equally divided into n sub-intervals including $d_0 \sim d_0+(d_r-d_0)/n$, $d_0+(d_r-d_0)/n \sim d_0+2(d_r-d_0)/n, \ldots$, and $d_0+(n-1)(d_r-d_0)/n \sim d_r$; an adjustable interval of the distance between the lens and the screen is $D_0 \sim D_r$, which is equally divided into n sub-intervals including $D_0 \sim D_0+(D_r-D_0)/n$, $D_0+(n-1)(D_r-D_0)/n \sim D_r$. The configuration parameter may include for any combination of a sub-interval of the distance between the left lens center and the right lens center and a sub-interval of the distance between the lens and the screen, the corresponding relation table may include a group of image correction parameters $k_1, k_2, \ldots, k_n$, which include n*n groups of image correction parameters $k_1, k_2, \ldots, k_n$. The corresponding relation table between the configuration parameter and the image correction parameter may be acquired through a fitting experiment. The configuration parameter may include a distance between a left lens center and a right lens center and a distance between a lens and a screen. The real-time configuration parameter of the virtual reality helmet may be acquired by measurements or by calculations based on an adjustment parameter.

In example embodiments of the disclosure, there may be image correction system for an adjustable virtual reality helmet. The image correction system may include a storing unit configured to store a corresponding relation table between a configuration parameter and an image correction parameter and an image correction formula of the virtual reality helmet. The image correction system may include a configuration parameter acquiring unit configured to acquire a real-time configuration parameter of the virtual reality helmet and report the real-time configuration parameter to the image correcting unit. The image correction system may include an image correcting unit configured to search, in the corresponding relation table, an image correction parameter corresponding to a configuration parameter closest to the real-time configuration parameter, and perform image correction by calling the image correction formula based on a searched image correction parameter. The image correction parameter may include an image distortion parameter and an image color aberration parameter, wherein the image correction formula may include an image distortion correction formula and an image color aberration compensation formula. The configuration parameter may include a distance between a left lens center and a right lens center and a distance between a lens and a screen. The configuration parameter may include a number of the image correction parameters is n, the image correction parameters including $k_1, k_2, \ldots, k_n$. The configuration parameter may include an adjustable interval of the distance between the left lens center and the right lens center is $d_0 \sim d_r$, which is equally divided into n sub-intervals including $d_0 \sim d_0+(d_r-d_0)/n$, $d_0+(d_r-d_0)/n \sim d_0+2(d_r-d_0)/n$, ..., and $d_0+(n-1)(d_r-d_0)/n \sim d_r$. The configuration parameter may include an adjustable interval of the distance between the lens and the screen is $D_0 \sim D_r$, which is equally divided into n sub-intervals including $D_0 \sim D_0+(D_r-D_0)/n$, $D_0+(D_r-D_0)/n \sim D_0+2(D_r-D_0)/n$, ..., $D_0+(n-1)(D_r-D_0)/n \sim D_r$. The configuration parameter may further include for any combination of a sub-interval of the distance between the left lens center and the right lens center and a sub-interval of the distance between the lens and the screen, the corresponding relation table includes a group of image correction parameters $k_1, k_2, \ldots, k_n$, which include n*n groups of image correction parameters $k_1, k_2, \ldots, k_n$. The image correction parameter may include an image distortion parameter and an image color aberration parameter, wherein the image correction formula may include an image distortion correction formula and an image color aberration compensation formula. The corresponding relation table between the configuration parameter and the image correction parameter may be acquired through a fitting experiment. The configuration parameter may include a distance between a left lens center and a right lens center and a distance between a lens and a screen. The configuration parameter acquiring unit may include a distance sensor configured to acquire the real-time configuration parameter by measurements. The configuration parameter acquiring unit may include a receiving unit configured to receive an adjustment parameter sent by a configuration adjusting unit. The configuration parameter acquiring unit may include a first calculating unit configured to calculate the real-time configuration parameter based on the adjustment parameter. The configuration parameter acquiring unit may include a distance sensor configured to acquire the real-time configuration parameter by measurements. The distance sensor may periodically measure the real-time configuration parameter of the virtual reality helmet and measure the real-time configuration parameter of the virtual reality helmet after receiving an adjustment notification sent by a configuration adjusting unit.

Although specific embodiments of this invention are described in detail through some examples, those skilled in the art shall understand that the above examples are explanatory only and are not intended to limit the scope of the invention, that modifications can be made to the above embodiments without departing from the scope and spirit of the invention, and that the scope of the invention is defined by the appended claims.

What is claimed is:

1. An image correction method for an adjustable virtual reality helmet, characterized by comprising the steps of:
   storing, in a storing unit associated with the virtual reality helmet, a corresponding relation table comprising relationships between configuration parameters and image correction parameters associated with image correction formulas of the virtual reality helmet;
   acquiring, by a configuration parameter acquiring unit associated with the virtual reality helmet, a real-time configuration parameter of the virtual reality helmet, the real-time configuration parameter related to an adjusted physical structure of the virtual reality helmet and acquired in real-time by the configuration parameter acquiring unit from sensors in the virtual reality helmet;
   searching, by an image correction unit operably connected to the configuration parameter acquiring unit and the storing unit, the corresponding relation table for a first image correction parameter related to a configuration parameter closest to the real-time configuration parameter; and
   performing, by the image correction unit, image correction on a screen of the virtual reality helmet by calling an image correction formula associated with the first image correction parameter from the corresponding relation table,
   wherein the relationships between the configuration parameters and the image correction parameters in the corresponding relation table are acquired through a fitting experiment.

2. The method of claim 1, wherein the first image correction parameter comprises an image distortion parameter and an image color aberration parameter, and wherein the image correction formula comprises an image distortion correction formula and an image color aberration compensation formula.

3. The method of claim 1, wherein:
   the configuration parameters comprise a distance between a left lens center and a right lens center and a distance between a lens and a screen;
   a number of the image correction parameters is n, the image correction parameters including $k_1, k_2, \ldots, k_n$;
   an adjustable interval of the distance between the left lens center and the right lens center is $d_0 \sim d_r$, which is equally divided into n sub-intervals including $d_0 \sim d_0+(d_r-d_0)/n$, $d_0+(d_r-d_0)/n \sim d_0+2(d_r-d_0)/n$, ..., and $d_0+(n-1)(d_r-d_0)/n \sim d_r$;
   an adjustable interval of the distance between the lens and the screen is $D_0 \sim D_r$, which is equally divided into n sub-intervals including $D_0 \sim D_0+(D_r-D_0)/n$, $D_0-k(D_r-D_0)/n \sim D_0+2(D_r-D_0)/n$, ..., $D_0+(n-1)(D_r-D_0)/n \sim D_r$; and
   for any combination of a sub-interval of the distance between the left lens center and the right lens center and a sub-interval of the distance between the lens and the screen, the corresponding relation table includes a group of image correction parameters $k_1, k_2, \ldots, k_n$.

4. The method of claim 1, wherein the real-time configuration parameter comprises a distance between a left lens center and a right lens center and a distance between a lens and a screen.

5. The method of claim 1, wherein the real-time configuration parameter of the virtual reality helmet is acquired by measurements from distance sensors in the virtual reality helmet or by calculations based on an adjustment parameter sent by a configuration adjusting unit in the virtual reality helmet.

6. An image correction system for an adjustable virtual reality helmet, characterized by comprising:
   a storing unit configured to store a corresponding relation table comprising relationships between configuration parameters and image correction parameters and an associated with image correction formulas of the virtual reality helmet;
   a configuration parameter acquiring unit configured to acquire a real-time configuration parameter of the virtual reality helmet and report the real-time configuration parameter to an image correcting unit, the real-time configuration parameter related to an adjusted physical structure of the virtual reality helmet and acquired in real-time by the configuration parameter acquiring unit from sensors in the virtual reality helmet; and the image correcting unit configured to search the corresponding relation table for a first image correction parameter related to a configuration parameter closest to the real-time configuration parameter, and perform image correction on a screen of the virtual reality helmet by calling an image correction formula associated with the first image correction parameter, wherein the relationships between the configuration parameters and the image correction parameters in the corresponding relation table are acquired through a fitting experiment.

7. The image correction system of claim 6, wherein the first image correction parameter comprises an image distortion parameter and an image color aberration parameter, and wherein the image correction formula comprises an image distortion correction formula and an image color aberration compensation formula.

8. The image correction system of claim 6, wherein:

the configuration parameters comprise a distance between a left lens center and a right lens center and a distance between a lens and a screen;

a number of the image correction parameters is n, the image correction parameters including $k_1, k_2, \ldots, k_n$;

an adjustable interval of the distance between the left lens center and the right lens center is $d_0 \sim d_r$, which is equally divided into n sub-intervals including $d_0 \sim d_0 + (d_r - d_0)/n$, $d_0 + (d_r - d_0)/n \sim d_0 + 2(d_r - d_0)/n$, . . . , and $d_0 + (n-1)(d_r - d_0)/n \sim d_r$;

an adjustable interval of the distance between the lens and the screen is $D_0 \sim D_r$, which is equally divided into n sub-intervals including $D_0 \sim D_0 - k(D_r - D_0)/n$, $D_0 - k(D_r - D_0)/n \sim D_0 + 2(D_r - D_0)/n$, . . . , $D_0 + (n-1)(D_r - D_0)/n \sim D_r$; and for any combination of a sub-interval of the distance between the left lens center and the right lens center and a sub-interval of the distance between the lens and the screen, the corresponding relation table includes a group of image correction parameters $k_1, k_2, \ldots, k_n$.

9. The image correction system of claim 6, wherein the real-time configuration parameter comprises a distance between a left lens center and a right lens center and a distance between a lens and a screen.

10. The image correction system of claim 6, characterized in that, the configuration parameter acquiring unit comprises:

a distance sensor configured to acquire the real-time configuration parameter by measurements.

11. The image correction system of claim 6, characterized in that, the configuration parameter acquiring unit comprises:

a receiving unit configured to receive an adjustment parameter sent by a configuration adjusting unit; and a first calculating unit configured to calculate the real-time configuration parameter based on the adjustment parameter.

12. The image correction system of claim 6, wherein the configuration parameter acquiring unit comprises a distance sensor configured to acquire the real-time configuration parameter by measurements, wherein the distance sensor periodically measures the real-time configuration parameter from the adjusted physical structure of the virtual reality helmet.

13. The image correction system of claim 6, characterized in that, the configuration parameter acquiring unit comprises a distance sensor configured to acquire the real-time configuration parameter by measurements, wherein the distance sensor measures the real-time configuration parameter of the virtual reality helmet after receiving an adjustment notification sent by a configuration adjusting unit.

* * * * *